US005432454A

United States Patent [19]

Durkin

[11] Patent Number: 5,432,454

[45] Date of Patent: Jul. 11, 1995

[54] APPARATUS AND METHOD TO CONTROL FREE CHARGE ON MOVING WEBS

[75] Inventor: William J. Durkin, Webster, N.Y.

[73] Assignee: Eastman Kodak Company, Rochester, N.Y.

[21] Appl. No.: 209,335

[22] Filed: Mar. 10, 1994

[51] Int. Cl.[6] ........................ G01N 27/60; H05F 3/06

[52] U.S. Cl. .................................... 324/452; 361/213; 264/22

[58] Field of Search ............... 324/452, 455, 459, 464; 361/213; 264/22; 355/216, 217, 219

[56] References Cited

U.S. PATENT DOCUMENTS

| | | | |
|---|---|---|---|
| 4,266,262 | 5/1981 | Haase, Jr. | 361/228 |
| 4,517,143 | 5/1985 | Kisler | 264/22 |
| 4,974,115 | 11/1990 | Breidegam et al. | 361/231 |

OTHER PUBLICATIONS

A. R. Blythe & W. Reddish, "Static eliminator systems for difficult industrial applications", pp. 115–123, Inst. Phys. Conf. Ser. No. 48.

N. Denbow & A. W. Bright, "The design and performance of novel on-line electrostatic charge-density monitors, injectors and neutralisers for use in fuel systems", pp. 171–179, Inst. Phys. Conf. Ser. No. 48.

A. R. Blythe, "A device for controlling static charge levels on film", pp. 239–245, Inst. Phys. Conf. Ser. No. 27, Chapter 3.

Prof. T. Horvath and Dr. I. Berta, "Static Elimination", pp. 58–59, 98–99, 100, Electronic and Electrical Engineering Research Studies, undated.

N. Shikhov, V. P. Sitnikov, O. A. Petrov, and V. I. Pyastolov, "An efficient high-voltage electrostatic charge neutralizer", translated Russian article, undated.

*Primary Examiner*—Walter E. Snow

*Attorney, Agent, or Firm*—Carl F. Ruoff

[57] ABSTRACT

The present invention is a method and apparatus for controlling free charge on a moving web. The method and apparatus includes two DC ionizers one of each polarity positioned near one surface of the web. A conductive plate mounted on the opposite side of the web opposite the DC ionizers is controlled in response to the free charge measured on the web downstream of the ionizers. The present invention allows control of the free charge on the web to almost zero without imparting any frequency in the charge on the web.

5 Claims, 2 Drawing Sheets

APPARATUS AND METHOD TO CONTROL FREE CHARGE ON MOVING WEBS

FIELD OF THE INVENTION

The present invention is a method and apparatus to control the free charge on a moving web.

BACKGROUND OF THE INVENTION

Part of the in-line process of preparing film support for emulsion coating in a film sensitizing machine is an electrostatic charge control operation. In film coating operations, it is necessary to control both free charge and polar charge, two different manifestations of charge imbalance. Free charge is when a bulk section of the web has more charge of one polarity than the other polarity. Polar charge is when a section of the web has the exact same number of charges of each polarity, but one surface has more of the positive charges and the other has more negative charges.

Two methods of controlling free charge on a moving web include; a brush discharger composed of fine wires which is only effective when the charge density is high; and an AC ionizer which leaves a 60 Hz distribution of charge on the web that can cause coating non-uniformities. Thus, these prior art methods are not totally effective at removing free charge.

FIG. 1 shows a third prior art method of controlling free charge on a moving web 12. The free charge is controlled by a pair of DC ionizers 13 with grounded screens, one a negative ionizer, the other a positive ionizer and a feedback control mechanism to control the corona wire voltage on the positive ionizer. The feedback mechanism includes a sensor 18 which measures the field on the web several feet after the DC ionizers, a controller (not shown), and a controllable high voltage power supply (not shown) to supply the voltage to the positive ionizer corona wire. The negative ionizer is run at a fixed corona wire voltage. Since a positive ionizer has a greater ion output than an identical negative ionizer run at the same voltage (but opposite polarity) controlling only the positive ionizer voltage is a sufficient means to control the net effect of the pair of ionizers.

The dual DC ionizer scheme is more effective at lower charge densities than the brush discharger and it does not impart a frequency to the web as does the AC ionizer scheme. The dual DC ionizer scheme as shown in FIG. 1 does, however, have two notable disadvantages. It is not very effective on moderately low charge densities and its ability to control the charge level tends to degrade as the back side charge density of the incoming web is reduced. As a result, on some supports the electric field on the web following a discharger can wander from approximately −2000 to +2000 volts per inch or so. The lack of control raises the variability of the process, in that operating at higher electric field strengths may be enough to attract airborne particulate matter to the web, and these can become incorporated into the film during coating. In addition, the electric field on the web increases the severity of coating imperfections caused by dirt and debris.

The present invention solves the problem of prior art charge control devices. It controls charge on the web, even at moderate levels, and it prevents wandering of the charge, and it imparts no charge frequency on the web.

SUMMARY OF THE INVENTION

A web free charge control method and apparatus includes two fixed voltage or fixed current DC ionizers, one of each polarity, and a conductive plate mounted opposite the ionizers with the web running between the plate and ionizers. The plate is isolated from the ground by a suitable high resistant mounting and is operated at a voltage which is variable over a range of positive and negative voltages and is controlled by an active feedback control mechanism to adjust and maintain the free charge level on the web to the desired level. The applied voltage on the plate serves to enhance the effectiveness of the ionizers when there is low charge density on the web and significantly improves the control of the free charge at low levels.

The present invention is a method to control the free charge on a web even at moderately low charge densities. It also has an advantage in that it can control the charge level to a predetermined level without wandering.

For a better understanding of the present invention together with other objects, advantages and capabilities thereof, reference is made to the following description and appended claims in connection with the above described drawings.

DETAILED DESCRIPTION OF THE PREFERRED EMBODIMENT

Figure 1:
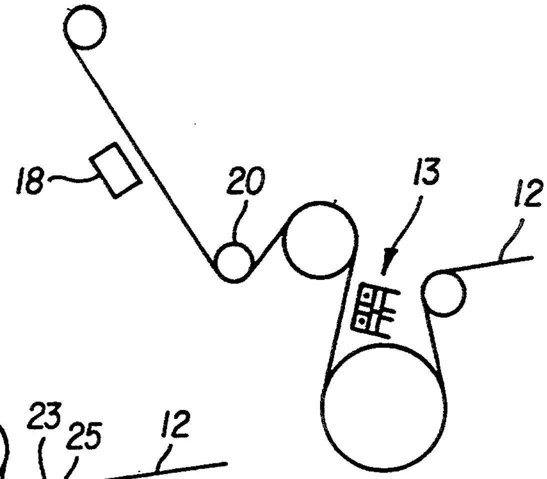
FIG. 1 (prior art)
FIG. 1 shows a free charge ionizer of the prior art.
Figure 2:
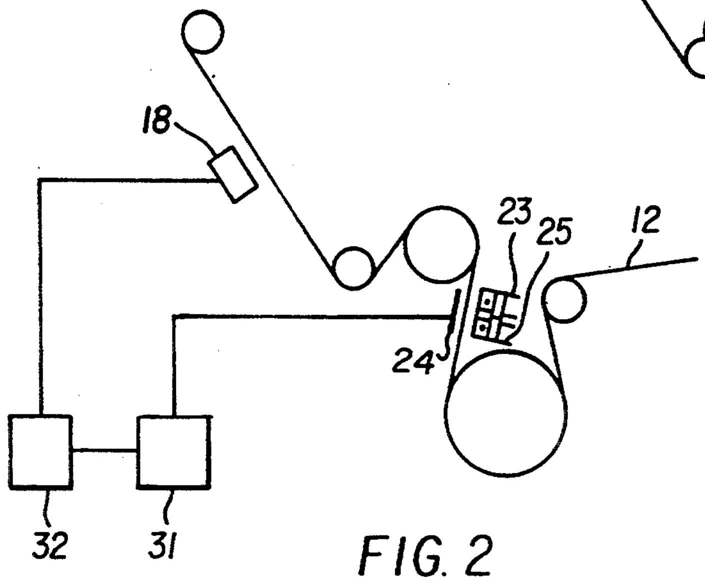
FIG. 2 shows a free charge ionizer of the present invention.

Shown in FIG. 2 is a schematic of the free charge control device of the present invention. As seen in FIG. 2, the free charge ionizer of the present invention can be implemented on prior free charge control ionizers with very little modification. In FIG. 2, the web 12 passes through the free charge ionizers 23 and 25 of the present invention, where the free charge is removed. Prior to entering these ionizers, it is preferable that the bound charge on the web be removed in some known manner. In this arrangement, the free charge ionizers 23 and 25 have a control plate 24 which is connected to a voltage source 31. Downstream of the free charge ionizers 23 and 25 is a device 18 for measuring the free charge on the web. This device 18 can be an electrostatic field meter which measures the field on the web. This device 18 is coupled to a controller 32 which outputs to a power supply 31 which applies a voltage to the control plate 24.

Figure 3:
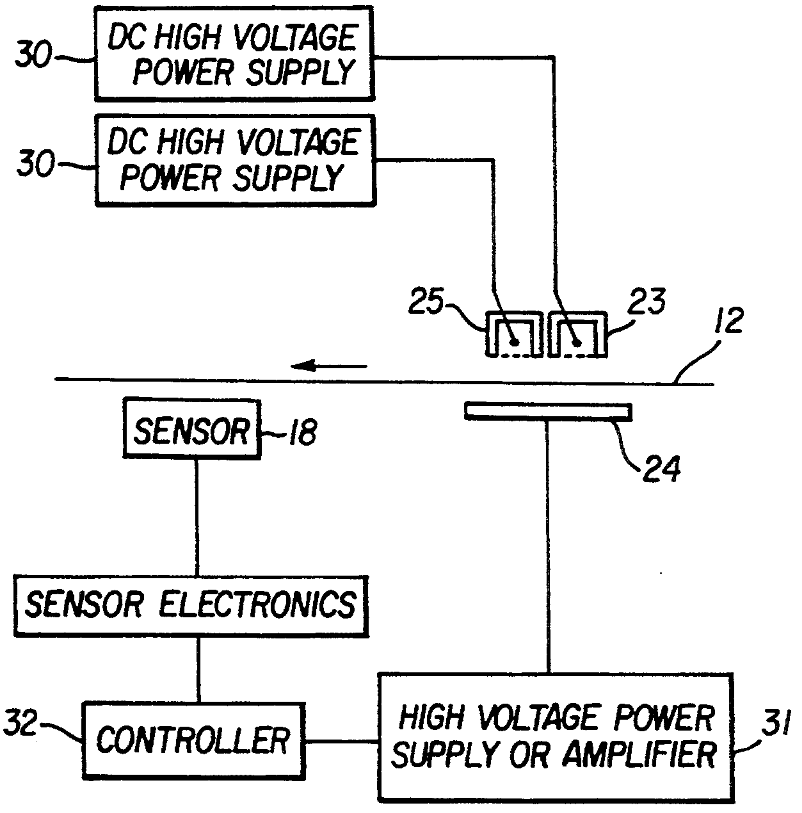
FIG. 3 shows a detailed schematic diagram of the free charge ionizer of the present invention.

A schematic of the voltage plate free charge ionizer control scheme is shown in FIG. 3. In FIG. 3, two fixed voltage or fixed DC current ionizers 23 and 25 are mounted near and facing the surface of the web 12 on a free span of travel. The ionizers 23 and 25 are mounted so that the central axis of the ionizer lies parallel to the web in the lateral direction of the web. Each of the ionizers is coupled to a DC high voltage power supply shown generally as 30. A conductive plate 24 which is electrically isolated from ground is positioned near the face of the ionizers, lying parallel to the ionizers in the lateral direction of the web 12 with the web running between the plate 24 and the ionizers 23 and 25. The plate 24 can be of various shapes, designs, constructions, or materials, including both solid materials and screens, but the plate 24 must incorporate a layer of conductive material that acts as an equipotential surface to attract charge from the ionizers 23 and 25. In addition, the plate may incorporate features in its design to reduce the risk of accidental electrical discharge from the plate to adjacent portions of the machine or to personnel such as conductive shields at ground potential, high resistant cover layers or current limiting resistors.

A controllable bipolar high voltage source 31 is coupled to the conductive plate 24 to deliver voltage to the plate over a wide range of positive and negative voltages. The bipolar high voltage power source can include a high voltage amplifier. The voltage range needed for best operation depends on geometric factors such as the size and shape of plate 24 and its distance from the web and from the ionizers as well as the presence of shield devices. Typical operating ranges for various geometric factors are from a few hundred volts in both polarities to a few thousand volts in both polarities.

Finally, a feedback controller 32 or control system that has a sensor 18 or array of sensors that responds to the mean charge density on the web following the free charge control mechanism is provided. The controller 32 provides a controlled signal to the controllable high voltage source so it can adjust the voltage on the plate in a smooth controlled manner so that the plate voltage increases in the same polarity as a direct function of the charge density on the web. The sensor 18 must be mounted in a location such that electric fields that effect the sensor are due to the charge distributed on the web, and not due to the voltage applied to the plate 24. To minimize control loop problems, the distance that the sensor is located longitudinally along the web path should be kept as short as possible, without causing the sensor to be unduly influenced by fields from the plate. A variety of sensors and controllers are possible, including both commercially available and one of a kind designs. Examples of sensors include: electrostatic field meters; non-contacting electrostatic voltmeters; plates that are capacitively coupled to the web but are connected to ground through a charge measuring device such as an electrometer. There are many kinds of controllers available for use in the present invention. They include a simple operational amplifier with a feedback loop to control loops in computers or programmable logic controllers. Allen-Bradley, GE, Taylor and Westinghouse all make devices that are designed to control to a set point. Any of these devices will work with the present invention. One readily available sensor would be a commercial electrostatic field meter mounted a short distance after the free charge control mechanism on a free span of the web. The signal from the field meter is applied to the input of a commercially available analog or digital controller which can be adjusted to provide an output voltage to a suitable controllable voltage source for the conductive plate, such as a high voltage bipolar amplifier.

EXAMPLE

A 35 mm wide web of 0.005 inch thick polyester and a web of 0.005 inch thick cellulose triacetate were successfully tested. A web-charging station was created in the web path by placing a grid-controlled ionizer close to the surface of the web as it traveled around a conveyance roller with about 120 degree wrap-angle. The corona wires in the ionizer were connected to a high voltage power supply and the grid and body of the ionizer was connected to ground through a resistor so that the grid and body attained a voltage that was determined by the ion current that was striking them and the value of the resistance to ground. On the span of web immediately following this roller, a pair of grounded-grid corona wire ionizers were mounted next to each other and facing the surface of the web that had contacted the roller, about ½ inch from the web. Opposite the ionizers, a metal plate was placed about ¼ inch from the web. The plate was electrically isolated from ground and connected to the output of a high voltage bipolar power supply. Further along this same span of web, a Monroe Model 245 fieldmeter probe was mounted about 1 cm from the surface of the web. The output of the Monroe fieldmeter was taken to a chart recorder so that it could be easily monitored by the person running the test. The configuration of the pair of grounded-grid ionizers, the plate and the fieldmeter probe conformed to the arrangement shown in FIG. 3.

Since an electronic controller was not available, the feedback to the plate was done manually. The output of the fieldmeter was charted. The person monitored the chart and adjusted the output of the bipolar high voltage power supply to bring the fieldmeter reading to zero. Although this was a rather crude control loop, in fact, if this charge control method worked well enough for an operator to easily adjust the power supply to maintain nearly zero electric field, then it would be easy to implement an electronic controller with appropriate tuning that could out-perform the person.

Figure 4:
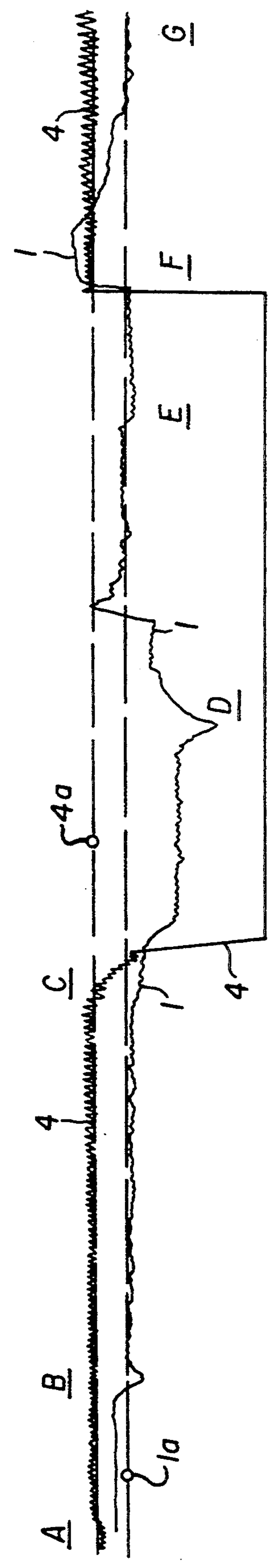
FIG. 4 shows a trace of web voltage at positions before and after the ionizer of the present invention.

The webs were run at various speeds with various charge levels being applied by the charging station,.and the operator easily adjusted the power supply to compensate for changes in charge level on the web and machine speed to maintain nominally zero field strength on the span following the plate. FIG. 4 is a section of the chart record for one of the runs at 300 fpm. The section shown represents just over 2 minutes of data. Trace 1, which is the output of the fieldmeter and Trace 4, which is a measure of the charge being applied to the web by the charging station before the web, were monitored. The chart recorder was set up so that each pen could record both positive and negative voltage, with positive values being represented on the upper half of the chart and negative values on the lower half of the chart. Pen 4 had its zero point at the dotted line labelled 4*a*. Pen 1 had its zero point below the center of Pen 4, at dotted line labelled 1*a*. The gain of the amplifier for pen 1 was adjusted so that the distance between the two zero points reprsent a change of 500 V/cm in field strength.

The chart has been labeled with letters A through G to facilitate explanation of what took place in this particular run. At the start of the run, A, the charge on the web was just slightly positive with all the ionizers turned on. The plate power supply was turned on, B, and adjusted to attain approximately zero field. At point C, the negative voltage supplied to the ionizer in the charging station was greatly increased, causing the net charge on the web to become highly negative. Pen 4 is deflected completely off the bottom of the chart at this point. Pen 1 shows that the field at the fieldmeter probe also went negative, to about −850 V/cm. At point D, the power supply for the plate was adjusted, first in the wrong direction, then in the correct direction. The power supply polarity was changed and the result was a positive going pulse that the operator compensated for by lowering the power supply voltage. Additional minor adjustments were made to the plate voltage at point E to bring the electric field to between zero and −100 V/cm. Then at point F, the negative power to the charger ionizer was turned off, causing the web charge to become slightly positive again. The field became about +800 V/cm. The operator readjusted the plate voltage to bring the fieldmeter reading down, so that at point G the field was within 50 Volt/cm of zero. This demonstrates that this method of free charge control is effective, even when the control is done manually.

This method and apparatus of free charge control can provide a very smooth control of the charge density on the web, even very close to zero. The present invention is a more effective means of controlling free charge on a web than prior art designs. It does not impart a modulated signal to the web as do methods using AC ionizers. In addition, this method has an advantage over schemes that vary the ion output of an ionizer by varying the ionizer corona wire voltage, because running the ionizers at fixed voltage or fixed current can extend the length of their operation, and this allows them to be operated at a narrow voltage or current range, where arcing and other high voltage damage is less likely to occur, thereby reducing the risk of malfunctions. The present invention also promotes easy detection of ionizer malfunctions since the current and voltage being applied to the ionizers are not affected by the controller, and so should not vary greatly when operating normally. Also the present invention has the advantage that it works well with DC ionizers that have grounded screens and bodies so that during both operation and testing, the ionizers are electrically safe for personnel. In addition, the high voltage plate of the present invention can be made electrically safe by applying shields and resistive coatings to prevent or limit current flow without affecting the performance of the charge control scheme.

While there has been shown and described what are at present considered the preferred embodiments of the invention, it will be obvious to those skilled in the art that various alterations and modifications may be made therein without departing from the scope of the invention.

What is claimed is:

1. An apparatus to control the free charge on a moving web comprising:

a first fixed voltage DC ionizer having a polarity;

a second fixed voltage DC ionizer having a polarity opposite said first ionizer, and positioned next to said first ionizer;

a conductive plate mounted opposite said first and second ionizers;

a controllable bipolar voltage source coupled to said conductive plate for controlling the voltage of said conductive plate;

means for moving a web between said conductive plate and said first and second ionizers;

means for measuring the mean charge density on the web downstream of said conductive plate and ionizers and generating an output;

wherein the charge on the moving web is controlled by adjusting the controllable bipolar voltage source in response to the output.

2. The apparatus according to claim 1 wherein said first and second fixed voltage DC ionizers are coupled to voltage supply.

3. An apparatus to control the free charge on a moving web comprising:

a first fixed current DC ionizer having a polarity;

a second fixed current DC ionizer having a polarity opposite said first ionizer, and positioned next to said first ionizer;

a conductive plate mounted opposite said first and second ionizers;

a controllable bipolar voltage source coupled to said conductive plate for controlling the voltage on said conductive plate;

means for moving a web between said conductive plate and said first and second ionizers;

means for measuring the mean charge density on the web downstream of said conductive plate and ionizers and generating an output;

wherein the charge on the moving web is controlled by adjusting the controllable bipolar voltage source in response to the output.

4. The apparatus according to claim 3 wherein said first and second fixed current DC ionizers are coupled to the voltage supply.

5. A method for controlling free charge on a web comprising:

moving a web having a first surface and a second surface through a treatment zone;

establishing a first fixed electrostatic field in the treatment zone facing the first surface of said web;

establishing a second fixed electrostatic field of opposite polarity from and next to the first field in the treatment zone facing the first surface of the web;

providing a conductive plate in the treatment zone facing the second surface of the web; and measuring the mean charge density on the web at a position downstream of the treatment zone; and controlling the voltage on the conductive plate in response to the mean charge density measured on the web.

* * * * *